(12) United States Patent
Monro

(10) Patent No.: US 7,352,298 B2
(45) Date of Patent: Apr. 1, 2008

(54) DATA COMPRESSION

(75) Inventor: Donald Martin Monro, Beckington (GB)

(73) Assignee: Ayscough Visuals LLC, Los Altos, CA (US)

( * ) Notice: Subject to any disclaimer, the term of this patent is extended or adjusted under 35 U.S.C. 154(b) by 0 days.

(21) Appl. No.: 10/572,121

(22) PCT Filed: Aug. 13, 2004

(86) PCT No.: PCT/GB2004/003495

§ 371 (c)(1),
(2), (4) Date: May 26, 2006

(87) PCT Pub. No.: WO2005/027049

PCT Pub. Date: Mar. 24, 2005

(65) Prior Publication Data

US 2007/0030177 A1    Feb. 8, 2007

(30) Foreign Application Priority Data

Sep. 18, 2003 (GB) ................... 0321954.0

(51) Int. Cl.
*H03M 7/00* (2006.01)
(52) U.S. Cl. .......................... 341/51; 341/50
(58) Field of Classification Search ............ 341/50, 341/51, 67, 65, 59, 106; 382/166, 241, 248, 382/249
See application file for complete search history.

(56) References Cited

U.S. PATENT DOCUMENTS

| 5,440,404 | A | * | 8/1995 | Okamoto | .................... 382/246 |
| 6,130,911 | A | * | 10/2000 | Lei | ........................ 375/240.16 |
| 6,757,437 | B1 | * | 6/2004 | Keith et al. | ................. 382/240 |
| 6,993,199 | B2 | * | 1/2006 | Chebil | ........................ 382/240 |
| 7,092,965 | B2 | * | 8/2006 | Easwar | .................... 707/104.1 |

FOREIGN PATENT DOCUMENTS

| WO | WO 98/37700 | 8/1998 |
| WO | WO 99/08449 | 2/1999 |
| WO | WO 02/13538 | 2/2002 |

OTHER PUBLICATIONS

Hu, P. et al., " A wavelet to DCT progressive image transcoder," *Proceedings 2000 International Conference on Image Processing*, Vancouver, Canada, Sep. 10-13, 2000, 1(7), 968-971.

(Continued)

*Primary Examiner*—Brian Young
(74) *Attorney, Agent, or Firm*—Woodcock Washburn LLP

(57) ABSTRACT

A method of data compression, for example for images or audio signals, comprises encoding the data using a transform such as a wavelet transform or a DCT, grouping the transform coefficients by most significant bit, and/or bit value, and transmitting them group by group. Where the transform uses a code book, such as matching pursuits, the coefficients may further be grouped by code book value. In one embodiment, the method allows the data to be described entirely by the positions of the coefficients, and the groupings, without any need to store or transmit any coefficient value information whatsoever.

23 Claims, 2 Drawing Sheets

OTHER PUBLICATIONS

Li, J. et al., "An Embedded Still Image Coder with Rate-distortion Optimization," *IEEE Transactions on Image Processing*, Jul. 1999, 8(7), 913-924.

Monro et al., "Visual Embedding of Wavelet Transform Coefficients," *Proceedings of the IEEE International Conference on Image Processing 2000*, Vancouver, Sep. 10-13, 2000.

Ordentlich, E. et al., "A low-complexity modeling approach for embedded coding of wavelet coefficients," *Data Compression Conference, Proceedings Snobird, UT*, Mar. 20, 1998, 408-417.

Shapiro, "Embedded Image Coding Using Zerotrees of Wavelet Coefficients," *IEEE Transactions on Signal Processing*, Dec. 1993, 41(12), 3445-3462.

Takahara, T. et al., "A new resolution progressive coding scheme using a sorting algorithm," *Proceedings of 7th IEEE International Conference on Image Processing*, Sep. 10, 2000, 3, 198-201.

Xingsong, H. et al., "An Embedded Wavelet Packet Image Coding Algorithm," *2002 IEEE International Conference on Acoustics, Speech, and Signal Processing*, Orlando, FL, May 13-17, 2002, 4, 3489-3492.

* cited by examiner

DATA COMPRESSION

CROSS-REFERENCE TO RELATED APPLICATIONS

This application is the National Phase of International Application No. PCT/GB2004/003495, filed Aug. 13, 2004, which claims the benefit of Great Britain Patent Application No. 0321954.0, filed Sep. 18, 2003, the disclosures of which are incorporated herein by reference in their entirety.

The present invention relates to methods and apparatus for data compression, and particularly although not exclusively to such methods and apparatus for compression of still or video images, and/or audio data.

There are number of known approaches to compressing image and audio data. Examples include the well known Joint Picture Expert Group (JPEG) algorithm for still picture encoding and decoding, and the Moving Picture Expert Group (MPEG) algorithms for encoding and decoding video data. These, together with many other encoding and decoding systems, make use of spatial transforms such as the Discrete Cosine Transform (DCT) to convert the original image data into a compressed form. Other algorithms use alternative transforms such as the Wavelet Transform.

Typically, the output from the chosen transform is a series of transform coefficients which, taken as a whole, define the encoded compressed form of the original data. When the data needs to be transferred across a communications medium such as for example the Internet or a low-bandwidth wireless connection, the coefficients are converted into binary form (bits) which can then be transmitted according to any preferred communications protocol or stored in any convenient form (e.g. on disk or in memory).

In an "embedded" system (using an "embedded quantizer"), the transform coefficients are ordered into layers of significance (bit planes), with the most significant bits normally being transmitted first. With such an "embedded" coding scheme, the recipient initially receives a low-resolution image which as transmission progresses is gradually refined into a higher-resolution image. That gives the recipient the possibility of terminating the transmission at any time once the image that has been received is of sufficient resolution for the recipient's needs.

Most embedded systems make use of the concept of significance-switching, in other words they provide some mechanism for advising the decoder of the position of the most significant bit of each of the coefficients. Without significance-switching, a considerable amount of the available bandwidth would be wasted by repeatedly sending insignificant bits for coefficients in which the first significant bit has not yet been reached. For positive coefficients, this means repeatedly sending zeros when the first significant bit (i.e. a 1) has not yet been reached. Some systems such as that by Shapiro do this by scanning one bit plane at a time: see Shapiro, *IEEE Transactions on Signal Processing*, 41(12); 3445 to 3462 December 1993 (further described in U.S. Pat. Nos. 5,321,776 and 5,315,670). Others notify the decoder of the most significant bit position by sending it explicitly. Several systems such as those described in documents WO-A-99/08449 and WO-A-98/37700 make use of masking techniques to improve bit transmission efficiency.

There are different systems of notation for representing negative numbers in digital systems, the most important of which are "sign and magnitude notation" and "twos complement notation". Although information is most often stored in computers in twos complement notation, for describing compression algorithms sign and magnitude notation is most often used. The description of this invention is given in terms of sign and magnitude notation, in which the first significant bit (FSB) of a positive number and its negative version are in the same position in the data word.

With all of the above techniques, the first significant bit of each individual coefficient is sent first, followed by successively less significant bits, bit plane by bit plane. When a particular cut-off bit plane is reached, the system may consider that no further refinement of the coefficient would be worthwhile, and hence no further bits which may exist below the cut-off bit plane are sent.

Recently it has been proposed that after a certain number of bits have been transmitted following the FSB it may not be worthwhile to send any more (see Monro et al., *Proceedings of the IEEE International Conference on Image Processing* 2000, Vancouver, further described in WO 02/13538). This implies that the number of bit patterns that follow the FSB is limited. For example if it is known that two further bits are to be defined following the FSB of a particular coefficient, the pattern can take only four possible combinations—11 10 01 or 00 (listed in descending order of magnitude).

The purpose of all of these techniques, and others like them, is to achieve efficient compression by transmitting or storing the values of the transform coefficients, and their positions in the transform data set, using as few bits as possible. Great ingenuity has been brought to bear in the design of ordering and packaging of coefficients for delivery mechanisms in order to minimise the theoretical number of bits (the entropy) required to sent the data. The standard approach is to aim to represent the positional information with the minimum number of bits, so as to allow as much of the available band width as possible to be devoted to bits which define the values of the data.

In the present invention, this approach is jettisoned entirely, and entropies are improved by concentrating more on the positional aspects of the data rather than its value. Taken to its extreme, the invention contemplates describing data sets entirely by way of positional information, and sending no value information at all.

According to a first aspect of the present invention there is provided a method of data compression comprising applying a transform to data to derive a plurality of transform coefficients; dividing the coefficients into a plurality of groups; and sequentially storing or transmitting the groups as compressed data. The groups are preferably non equally-probable.

The invention further extends to a computer program for carrying out the method, as well as to a machine-readable data carrier (e.g. a CD) which carries such a computer program, and to a bit-stream (e.g. as downloaded across the internet) which is representative of such a computer program. It further extends to a coder for carrying out the method, and to a codec which includes such a coder.

By grouping the coefficients wholly or partly according to a characteristic of the coefficient value (or according to some side information), and laying stress on the explicit sending of positional rather than value-related information, the applicants have found that efficiency may be further increased. That applies, surprisingly, even where the number of groupings is large (for example the same as the number of coefficients). Where there are fewer data values than possible groups, some of the groups will be empty, and efficiency then may then be further increased by run-length coding the groups for transmission.

This reduction in entropy by division into groups might arise for several reasons, associated with non-stationarity of the data. For example coefficient values or codebook entries might have frequencies of occurrence which differ slightly and might also be position dependent. By division of the coefficients into groups differences in the statistics of the groups may be uncovered which would lead to a lower total entropy than if the groups were combined.

Even if the mean number of values per group is less than one, the method described still offers efficiency gains if the coder arranges to tell the decoder that there are runs of empty groups.

The invention may be carried into practice in a number of ways, and some specific embodiments will now be described, by way of example, with reference to the accompanying drawings in which.

Figures 1, 2:
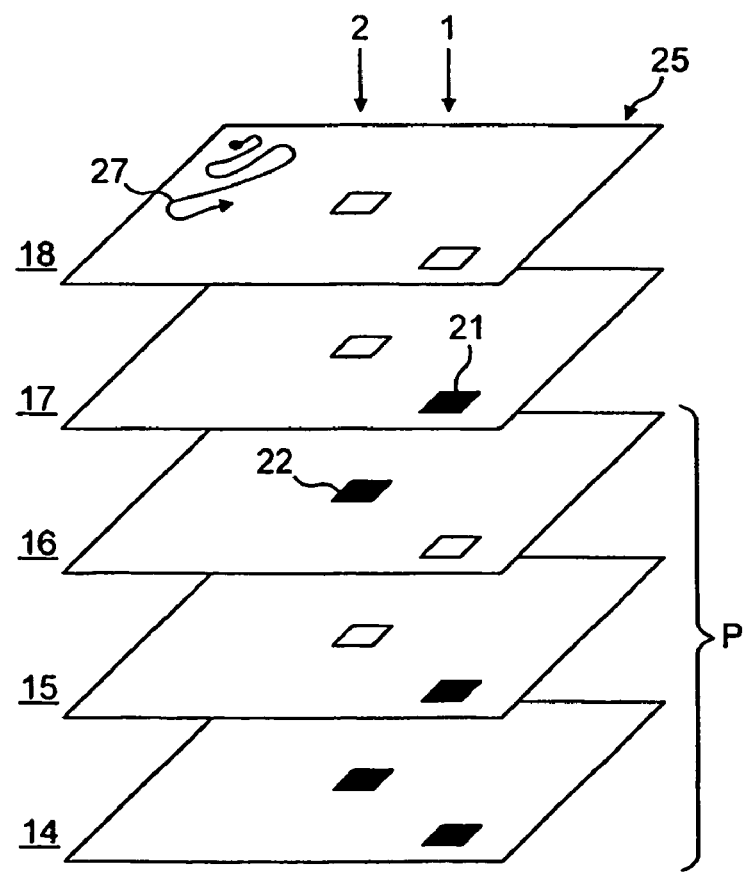
FIG. 1 shows an example of a 2-scale wavelet transform of a 4×4 image.
FIG. 2 illustrates the coefficients of FIG. 1 split into bit planes.

Turning first to FIG. 1, this shows the output of a wavelet transform of the type that we may wish to bit-wise encode for storage or onward transmission across a communications medium. In this example, the output shown in FIG. 1 represents a 2-scale wavelet transform of a 4×4 image, but in a practical embodiment the range of coefficient values and image sizes would typically be much larger, and the number of wavelet scales may also be greater. The data set to be bitwise encoded need not necessarily be the coefficients of a wavelet transform (although that is preferred) and the invention is equally applicable to output sets consisting of the coefficients of any other type of transform including FFT, DCT, Lapped orthogonal transform and so on. The methods described below may also be used for the efficient bitwise compression other data sets, that is those that are not necessarily representative of an image or of audio. The methods described will work equally well for the efficient bitwise compression of for example spread sheet data or word processing data. Any associated characteristics such as colour, font, language or even smell could also form the basis of coefficient grouping.

The method starts conventionally by converting the coefficient values into binary bits, and considering the bit planes individually, as shown in FIG. 2. For the sake of simplicity, FIG. 2 shows just two coefficients 1,2. The first of these has a first significant bit (FSB) 21 at bit plane 17 while the second has a FSB 22 at bitplane 16. In the diagram, filled squares represent ones and open squares represent zeros.

The data set 25 under consideration in FIG. 2 may either be the entirety of the data set shown in FIG. 1, or it may be merely a part of it. Where the data set being compressed comprises the coefficients of a wavelet transform, the data set 25 of FIG. 2 may represent one of the individual sub-bands 11, as shown in FIG. 1.

In one type of traditional "embedded" system, such as that as Shapiro, the bits of the transformed coefficients would normally be sent layer by layer, with the most significant bits transmitted first. In such a system, therefore, bit 21 would normally be transmitted first, followed in order by significant bits in bit planes 16, 15 and 14. No bits are sent in this system below a predefined threshold bit plane (14 in this example). A unique position also has to be identified for each bit sent, to enable the decoder to work out where the bit is on the bit plane. That can be done in numerous ways, one of which is to specify the position of the bit along a zigzag scanning path 27 on the appropriate bit plane. Many other scanning schemes are known.

Figure 3:
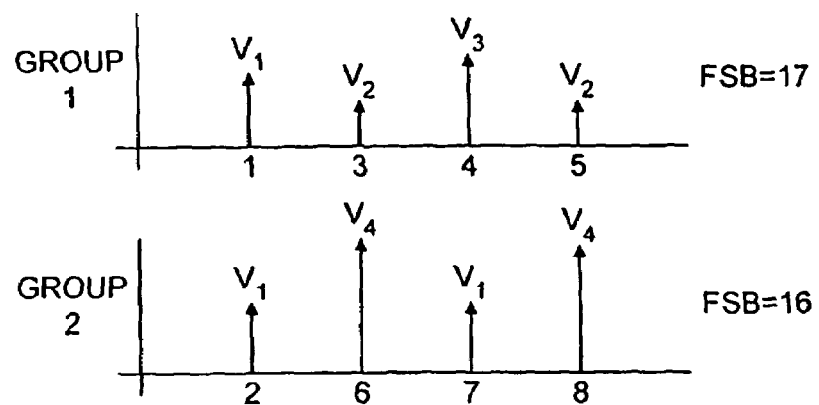
FIG. 3 shows a first coefficient grouping according to an embodiment of the invention.

In the present invention, by contrast, the bits of the coefficients are not crudely sent bit plane by bit plane, but they are instead grouped before sending or storing. This may be done in a number of ways. In the preferred embodiment the coefficients are first grouped by their first significant bit, as shown in FIG. 3. Here, we have assumed that there are 8 coefficients in all to be sent which are split up into two groups: a first group in which the FSB is on bit plane 17, and a second group in which the FSB is on bitplane 16. Coefficients 1 and 2 correspond with those already illustrated in FIG. 2; coefficients 3 to 8 have for clarity not been shown in FIG. 2.

Figure 4:
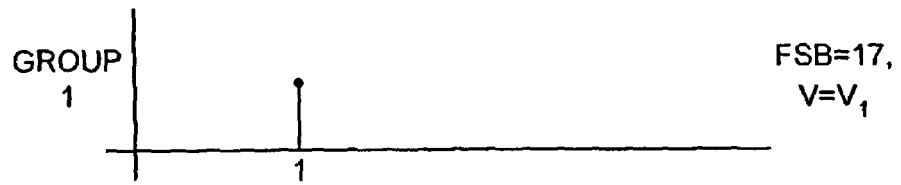
FIG. 4 shows a second grouping.
Figure 4:
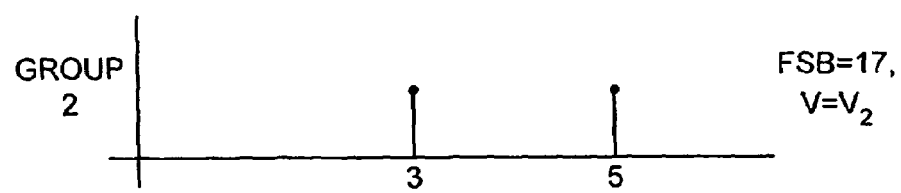
Figure 4:
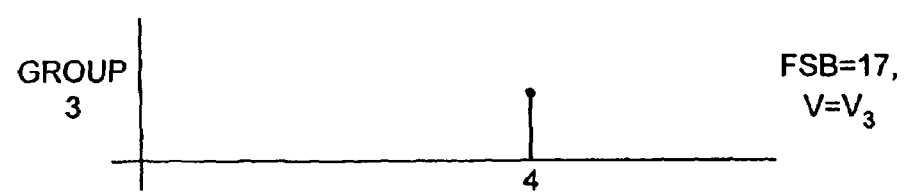
Figure 4:
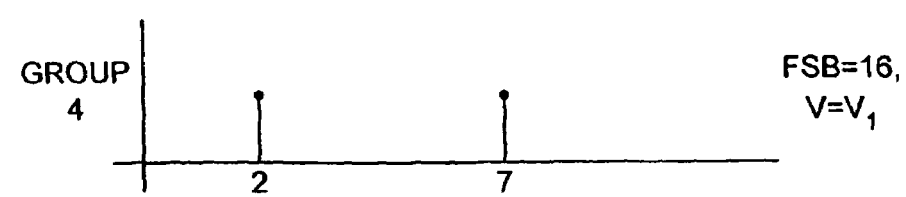
Figure 4:
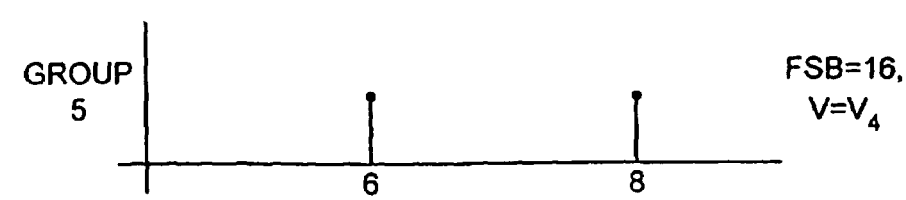

Having split the coefficients up into two groups we sub-divide further, as shown in FIG. 4. In this example, the coefficients are further divided by bit value. There are a total of four bit values ($V_1$, $V_2$, $V_3$, $V_4$) which, in combination with the two possible values of the FSB, gives a total of eight groups, three of which are empty. The groups are then sent (or stored) one by one, by the coefficients within each individual group being sent bit plane by bit plane. In the example, therefore, coefficient 1 is sent first; then coefficients 3 and 5, bit plane by bit plane; then coefficient 4; then coefficients 2 and 7, bit plane by bit plane; and finally coefficients 6 and 8, bit plane by bit plane.

By "bit value" we mean sequence of bits, so for example if the coefficients have already been divided up by FSB and it has been decided that only two further bits will be sent, any of the eight possible coefficient or data values 101xxx, i.e. 101000, 101001, 101010 and so on, will be placed in the same group since the sequence of bits following the FSB is 01 in each case. Since digital data can take on only a discrete number of values, the number of groups will be limited, although may be large if large numbers of bits are to be sent.

Even if the bit values are equally probable, we are still improving the embedding of the data by dividing into groups by bit value. In this example, four possible bit values can occur, 11, 10, 01, and 00 (in descending order of magnitude). Sending the groups in this order gives improved embedding as the bit values adding the most power to a decoded image or signal are sent first.

It would also be possible for variable-depth encoding to be used, in other words for different numbers of bits to be sent for different coefficients. If we are sending purely positional information, the fact that some coefficients need to be sent at greater precision than others does not need to be known by the decoder since all the information it needs is fully described by the groupings. Several coefficients to be sent at very high precision are likely to have unique bit values, and will therefore end up in groups on their own, whereas coefficients to be sent at very low precision are likely to have non-unique bit values, and therefore to end up all in the same group.

Another possibility (which may be used on its own or in combination with one or more of the approaches discussed above) is to send the coefficients bit plane by bit plane, but grouped in each case according to the value of the next unsent bit. So, for example, the coefficients may be split into two groups those whose next bit is 1, and those whose next bit is 0. The first group is then sent (or stored) followed by the second group. So, effectively, one is simply sending the position of each coefficient within the group, rather than the value of the coefficient itself. This approach still works even where there are large numbers of bits to be sent. This technique can be seen as applying the invention described here in cases where the FSB is signalled by its position in the bit plane being scanned, and only one further bit is to be defined. However, it could be used to improved standard bit plane scanning techniques because firstly it improves the embedding if the 1 bits are signalled before the 0 bits, and secondly it has been noticed by practitioners that 0 and 1 bits in refinement do not occur with equal probability.

In further embodiments (not shown) alternative groupings may be used. For example, where the coefficients define a codebook number or atom, the groupings may be based upon that, either instead of or in addition to the FSB. Typically, the groupings may consist of any one of the following individually or in any combination: the FSB; the amplitude; the bit value; the atom/codebook; or any other information ("side information") which is associated with the coefficients. Grouping by sign is also possible, but in many situations is not particularly helpful since the + sign group will normally be equally probable to the − sign group.

Other grouping parameters are not excluded, and depending upon the nature of the data set to be compressed, parameters other than those described here may be convenient. For example, where a transform such as a wavelet transform has been used to divide the data up into frequency-dependent sub-bands, the sub-bands themselves may form the basis of a primary or secondary grouping. Such an approach may be convenient when the present method is used in association with a conventional algorithm such as the Zerotree Wavelet Algorithm (EZW) of Shapiro, described in his paper *"Embedded Image Coding Using Zerotrees of Wavelet Coefficients"*, mentioned above. Any associated characteristics such as colour, font, language or even smell could also form the basis of coefficient grouping.

The grouping order may be defined in any convenient way, according to the application in hand. So, while it may frequently be convenient to group first by FSB and then by atom, which would give good embedding, it would be equally possible if desired to group first by atom and then by FSB.

In some embodiments, the groupings may be selected so that one ends up with a unique coefficient or data item with all its attributes defined by its group. In such a case, all the attributes of a particular coefficient are uniquely defined by its group, which means that it is no longer necessary to send any coefficient information whatsoever. Instead, the system simply has to send information on the position of the coefficient within the data set. While it may seem counter-intuitive to send no explicit coefficient magnitude at all, that information in fact is no longer required since everything the decoder needs to reconstruct the data set is contained within the positional information and (implicitly) by the groupings themselves. Typically, such an approach will require grouping by sign as well as other attributes.

The groups themselves may be encoded for transmission in any convenient way. It will be understood of course that in practice run length coding, Huffman, arithmetic coding techniques or other lossless compression algorithms may be applied to the sequence of coefficients being sent, to reduce the entropy further. As with the standard methods, the values of each coefficient will normally be sent bit by bit, starting with the FSB and finishing at some predefined cut off point. This may either be a fixed bit plane (e.g. plane 14) or to some predefined depth below the FSB for each coefficient (e.g. three bits below the msp in each case, as indicated by the letter P in FIG. 2).

By grouping the data in this way, the decoder (which knows the algorithm being used by the coder) is able to determine the bit plane of the FSB merely from its position in the received data stream, without the value of the FSB having to be transmitted separately.

Of course, the decoder needs to be able to know where it is in the received data string. This can be achieved by sending an end of group (EOG) symbol at the end of every group, or alternatively by signalling before each group is transmitted how many value are to follow. It may also be convenient in some circumstances for the coder to transmit a mask which tells the encoder which groups are populated. Alternatively, the groups themselves may be run length encoded so that long runs of identical groups (particularly empty groups) are not sent.

In the preferred embodiment we run length code the positions of the groups, sending out at the same time any other attributes not used for grouping. Alternatively, after signalling the position of the groups by run length coding, the other attributes could be sent as a scan through the group.

In the current embodiment of the technique, the level of grouping is defined by a user-selectable switch, as follows;
0. Group by FSB only
1. Group by FSB, and bitvalue.
2. (for appropriate data sets) Group by FSB, bit value, atom/number in codebook, and possibly sign as well.

Set out below are four pseudocode listings, illustrating various transfer possibilities. In each case, it is to be assumed that the data has already been partitioned into as many groups as required.

Listing 1:
For every group
   send the positional information for the group along with any ungrouped data.
   signal the end of the group.

Listing 2:
For every group
   signal how many values there are
   send the positional information for the group along with any ungrouped data Listing 3: (if there are many empty groups)
   Repeat
      signal how many empty groups precede the next non-empty group.
      for each non-empty group
         send the positional information for the group along with any ungrouped data
         signal the end of group
   until all groups are scanned Listing 4: (if there are many empty groups)
   Repeat
      signal how many empty groups precede the next non-empty group
      for each non-empty group
         signal how many values there are
         send the positional information for the group along with any ungrouped data
   until all groups are scanned.

The method described may where applicable be used in association with predictive algorithms (for predicting the positions of the coefficients) if the coefficients are correlated. This may reduce the entropy still further.

While FIGS. 1 to 4 illustrate the use of the method for compressing a two-dimensional data set, it will be understood that the method is equally applicable to the compression of a one-dimensional data set, such as a transformed audio signal. The method described would be equally applicable to the compression of textual information, including for example word processing and spreadsheet files, as well as to a wide range of other data. In fact, the method described could be used to compress any (compressible) data whether or not a transform is applied.

What is claimed:

1. A method of data compression comprising:
applying a transform to data to derive a plurality of transform coefficients;
dividing the coefficients into a plurality of groups, whereby the coefficients are grouped according to a characteristic of coefficient value, whereby the coefficients are grouped according to their first significant bit, and whereby the coefficients are grouped in any desired order by the plurality of groups; and
sequentially storing or transmitting the groups as compressed data.

2. A method of data compression as claimed in claim 1 in which the coefficients are grouped according to their bit value.

3. A method of data compression as claimed in claim 1 in which the coefficients are grouped according to the value of the next bit that has not yet been stored or transmitted.

4. A method of data compression as claimed in claim 1 in which the coefficients are grouped by sign.

5. A method of data compression as claimed in claim 1 in which the coefficients are grouped by amplitude.

6. A method of data compression as claimed in claim 1 in which each coefficient is associated with respective side information, the coefficients being grouped according to a characteristic of the side information.

7. A method of data compression as claimed in claim 1 in which the transform relies on a code book, with the coefficients consisting of or including code book references, the coefficients being grouped according to their respective code book references.

8. A method of data compression as claimed in claim 1 in which all information to be encoded about a given coefficient may be determined from the group in which it is placed.

9. A method of data compression as claimed in claim 1 in which positional information for each coefficient is stored or transmitted, but no value-related information other than an identification of the group in which it is placed.

10. A method of data compression as claimed in claim 1 in which positional information for each coefficient is stored or transmitted along with all remaining value-related information other than that which may be determined from the group in which it is placed.

11. A method of data compression as claimed in claim 1 in which the groups are run length encoded before storage or transmission.

12. A method of data compression as claimed in claim 1 in which the transform is a wavelet transform.

13. A method of data compression as claimed in claim 1 in which the transform is a fast fourier transform.

14. A method of data compression as claimed in claim 1 in which the transform is a discrete cosine transform.

15. A method of data compression as claimed in claim 1 in which the transform is a lapped orthogonal transform.

16. A method of data compression as claimed in claim 1 in which the data is representative of a still image or a video.

17. A method of data compression as claimed in claim 1 in which the data is representative of an audio stream.

18. A method of data compression as claimed in claim 1 in which the data is representative of text.

19. A computer program stored on a computer-readable medium for carrying out the method of claim 1.

20. A machine readable data carrier carrying a computer program as claimed in claim 19.

21. A bit stream stored on a computer-readable medium representative of a computer program as claimed in claim 19.

22. A coder for carrying out the method of claim 1.

23. A codec including a coder as claimed in claim 22.

* * * * *